(12) United States Patent
Schlager

(10) Patent No.: US 11,352,569 B2
(45) Date of Patent: Jun. 7, 2022

(54) METHOD FOR CONTINUOUSLY TREATING VACUUM RESIDUALS ORIGINATING FROM THE REFINERY OF CRUDE OIL

(71) Applicant: List Technology AG, Arisdorf (CH)

(72) Inventor: George Schlager, Charlotte, NC (US)

(73) Assignee: LIST TECHNOLOGY AG, Arisdorf (CH)

( * ) Notice: Subject to any disclaimer, the term of this patent is extended or adjusted under 35 U.S.C. 154(b) by 239 days.

(21) Appl. No.: 16/486,910

(22) PCT Filed: Feb. 16, 2018

(86) PCT No.: PCT/EP2018/053850
§ 371 (c)(1),
(2) Date: Aug. 19, 2019

(87) PCT Pub. No.: WO2018/149951
PCT Pub. Date: Aug. 23, 2018

(65) Prior Publication Data
US 2021/0024833 A1 Jan. 28, 2021

(30) Foreign Application Priority Data
Feb. 17, 2017 (DE) ...................... 10 2017 103 363.7

(51) Int. Cl.
*C10G 7/06* (2006.01)
*B01F 27/723* (2022.01)
(Continued)

(52) U.S. Cl.
CPC .............. *C10G 7/06* (2013.01); *B01F 27/723* (2022.01); *B01F 35/75455* (2022.01); *B01F 2035/351* (2022.01); *C10G 2300/1074* (2013.01)

(58) Field of Classification Search
CPC .......... B01J 2/10; B01J 20/3014; B09B 3/38; B29B 7/02; B29B 7/04; B29B 7/30; B29B 7/32; B29B 7/34; B29B 7/802; B22C 5/04; B28C 1/16; C10G 7/06; C10G 31/06; C10G 31/10; C10G 2300/1074; C10G 2300/1077; B01F 27/723; B01F 35/75455; B01F 2035/351
See application file for complete search history.

(56) References Cited

U.S. PATENT DOCUMENTS

| 1,852,205 A | 4/1932 | Gensecke |
| 3,880,407 A | 4/1975 | List |

(Continued)

FOREIGN PATENT DOCUMENTS

| CA | 2737497 A1 | 4/2010 |
| CH | 674959 A5 | 8/1990 |

(Continued)

OTHER PUBLICATIONS

Indian office action for patent application No. 201947037211 dated Mar. 19, 2021.

(Continued)

*Primary Examiner* — Brian A McCaig
(74) *Attorney, Agent, or Firm* — Bachman & LaPointe, PC

(57) ABSTRACT

In a method for continuously treating vacuum residuals originating from the refinery of crude oil, the vacuum residuals are continuously fed into an agitated vessel.

4 Claims, 4 Drawing Sheets

(51) Int. Cl.
    *B01F 35/75*     (2022.01)
    *B01F 35/30*     (2022.01)

(56) References Cited

U.S. PATENT DOCUMENTS

| | | |
|---|---|---|
| 4,889,431 A | 12/1989 | Liechti |
| 6,413,415 B1 | 7/2002 | Weiss et al. |
| 2004/0011707 A1 | 1/2004 | Cerea |
| 2008/0173531 A1 | 7/2008 | Kesler |
| 2014/0376327 A1 | 12/2014 | Fleury et al. |
| 2019/0093022 A1* | 3/2019 | Fleury .................... C10G 31/06 |

FOREIGN PATENT DOCUMENTS

| | | | | |
|---|---|---|---|---|
| DE | 2823129 A1 | 12/1978 | | |
| DE | 3744269 A1 | 7/1989 | | |
| DE | 102014116757 | * 5/2016 | ............... | C10C 1/00 |
| EP | 0356419 A2 | 2/1990 | | |
| EP | 1436073 A1 | 7/2004 | | |
| RU | 2374298 C1 | 11/2009 | | |

OTHER PUBLICATIONS

German office action for patent application No. 10 2017 103 363.7 dated Jan. 29, 2020.
International application No. PCT/EP2018/053850 dated Jul. 2, 2018.
Chinese office action for patent application No. 201880012241.4 dated Feb. 4, 2021.

* cited by examiner

METHOD FOR CONTINUOUSLY TREATING VACUUM RESIDUALS ORIGINATING FROM THE REFINERY OF CRUDE OIL

BACKGROUND OF THE INVENTION

The present invention is directed to a method for continuously treating vacuum residuals originating from the refinery of crude oil.

Crude oil contains a large number of valuable substances, including a lot of economically important products. Crude oil is, for example, the raw material for fuel gases, Liquefied Petroleum Gas (LPG), aviation gasoline, automotive gasoline, light solvents, jet fuels, kerosene, heavy solvents, distillate fuel oil and diesel fuel oil. The aforementioned products are obtained by a number of different process steps during the refinery process. The substances which remain after valuable substances were extracted during the distillation steps of the refinery process are collectively referred to as residuals.

In refinery processes according to the state of the art, the crude oil is desalted to prevent corrosion of the subsequently used machinery and introduced into a first distillation column, also called fractionating column. This first distillation step is usually carried out under atmospheric pressure in a column which is up to 50 meters high. Valuable substances such as gases, so-called "Naphta", Kerosene and others are extracted and separated from the residuals. The first column is equipped usually with only one inlet port but with several outlet ports at different heights. A temperature profile is established alongside the column, wherein the bottom has the highest temperature and the top has the lowest temperature. Components of the crude oil which do not transition into the gas phase inside the first column form its residuals, they are often called atmospheric residuals.

At the top-near outlet ports of the columns, substances with the lowest molecular weight and the lowest viscosity are obtained. The lower the outlet port in the column, the higher is the molecular weight of the substances obtained and the higher is their viscosity. Thus, a gradient is observed for molecular weight and viscosity of the obtained substances.

Moreover, a gradient is observed for tray efficiency, which corresponds to the quality of separation in the column. The higher the outlet port, the higher the tray efficiency.

These atmospheric residuals are thereafter subjected to a second distillation step in a second column which works analogously to the first one but is performed under vacuum in order to extract and separate valuable substances which were not extracted by distillation under atmospheric pressure conditions. The pressure in this second column is often around 20 mbar. The valuable substances obtained from this second distillation step are called light vacuum distillate and heavy distillate. The residuals remaining from this second distillation step are called vacuum residuals. According to the state of the art, the vacuum residuals are, for example, introduced into a coker and cracked, i.e. chemically broken down in substances of lower molecular weight, at high temperatures of, for example, 500° C. Valuable substances which are not extracted by the first or the second distillation step remain in the residuals fraction and are cracked and can therefore not be used to produce fuels or the like.

SUMMARY OF THE INVENTION

It is an object of the present invention to provide a method and an apparatus to efficiently extract remaining valuable substances from the vacuum residual of crude oil.

The present invention is directed to a method for continuously treating vacuum residuals originating from the refinery of crude oil, wherein the crude oil is subjected to a first and a second distillation step, wherein the second distillation step is performed under vacuum conditions, wherein the vacuum residuals are obtained after the second distillation step, wherein the vacuum residuals are continuously fed into a agitated vessel wherein the vacuum residuals in the agitated vessel are subjected to a vacuum of 10 mbar or lower and to a temperature of at least 300° C. to remove volatiles which could not be removed by the distillation steps.

The agitated vessel preferably comprises a housing and a shaft with moving elements mounted thereon.

This method is suitable for sour crude oil and crude oil with an API gravity lower than 30 or 20 or even lower than 15.

The first distillation step can be performed at atmospheric pressure conditions and the second distillation step is performed under vacuum conditions.

The treatment in the agitated vessel may be regarded as third distillation step.

According to the present invention, an "agitated vessel" is a vessel preferably designed to heat substances being kept in motion by moving elements while volatiles get separated from the substance, preferably by evaporation. Evaporation may take place due to heated surfaces in the vessel and/or by incorporation of mechanical energy caused by agitation of the elements. The moving elements are preferably used to target a prevention of crust formation and surface renewal.

The vacuum in the agitated vessel is preferably less than 10 mbar, more preferably less than 5 mbar, more preferably less than 1 mbar and even more preferably less than 0.5 or even less than 0.1 mbar.

The temperature inside the agitated vessel is preferably between 300° C. and 500° C. It may be between 300° C. and 450° C. or between 300° C. and 400° C. or between 300° C. and 350° C. The lower border in the aforementioned ranges may be set at 320° C. or at 340° C. Preferably, the temperature is chosen so that the valuable substances to be removed are not destroyed by the heat.

Heating can be provided by different methods. Components such as the shaft, the housing, the moving elements, especially the kneading elements, or the kneading counter-elements or other elements of the vessel may be constructed in a hollow fashion and heating fluid may be circulating inside. For example, heating oil can be used. Synthetic heating fluids which are stable at higher temperatures can also be used. Moreover, steam can be used. Moreover, the vessel can be provided with a heating jacket. Another possibility is to directly apply at least one burner's flame to a component, especially to the housing of the vessel.

Especially if a single- or twin-shaft mixer kneader is utilized as agitated vessel, the length/diameter-ratio is preferably bigger than 2, more preferably bigger than 2.5 and even more preferably bigger than 3.0. Especially if a single- or twin-shaft mixer kneader is utilized as agitated vessel, its length may be more than 4 meters, preferably more than more 5 or even more 6 or 7 meters. Especially if a single- or twin-shaft mixer kneader is utilized as agitated vessel, its volume might be 3 to 25 cubic metres, preferably 3 to 15 cubic metres and more preferably 5 to 12 cubic metres.

The aforementioned for treating vacuum residuals is important, because vacuum residuals have to be cracked or brought to disposal and are often toxic. It is therefore desirable to keep the proportion of residuals which remain after the refinery process as low as possible. Moreover, the proportion of residuals in a given volume of crude oil will rise in the future because the available sources of high-quality crude oil will soon be exhausted. The separation of crude oil into valuable substances on the one hand and residuals on the other hand is never perfect. Therefore the need to improve that separation will rise in the future, not only due the rising proportion of residuals to be cracked or brought to disposal, but also due to the declining proportion of valuable substances to exploit, which in turn limits the profit to be obtained from a given volume of crude oil.

While in the past, often more then 97% of crude oil could be turned into products and less than 3% of the crude oil had to be disposed as residuals. These numbers for example applied to so-called "sweet" oils containing less than 0.1% sulphur with an API gravity of around 50. However, in the future one will have to use crude oil which—with state-of-the-art-methods—can only yield up to around 60% of products and up to around 40% residuals. These numbers for example apply to so-called "very heavy, very sour" crude oils containing more than 1.8% sulphur with an API gravity of less than 15.

In the future it will be economically favourable, to invest more effort to near-complete extraction of valuable substances from crude oil.

A preferred agitated vessel is a kneader reactor, also called mixer kneader. Such kneader reactors are known and described, for example, in the dissertation "Methodenentwicklung und -anwendung zur Untersuchung des Misch- and Entgasungsverhaltens in Knetreaktoren", ISBN 978-3-8440-1021-3. Twin-shaft mixer kneaders are, for example, described in US 2014 0 376 327 A1 and CA 2 737 497 and EP 1 436 073 B1. Single-shaft mixer kneaders are, for example, described in US 4 889 431 and CH 674 959 A5.

Alternative examples of agitated vessels are agitated columns, for example vertical agitated columns such as wiped film evaporators, thin film evaporator or the like. Filmtruders as described, for example, in EP 0 356 419 A2 and DE 28 23 129 C2.

An advantage of the present invention is that it smoothly fits into state-of-the-art crude oil refinery processes without the need to buy any other new equipment besides the equipment needed to perform the steps according to the present invention. The equipment used so far does not have to be exchanged or altered, since the present invention mainly adds a third very effective distillation step.

It has been found that when conducting the currently used distillation steps in distillation columns at very low pressure below 20 mbar and/or at very high temperatures, the viscosity of the crude oil inside the column rises and the column cannot be handled anymore and gets clogged. This does not happen with the agitated vessels used according to the present invention.

According to an example of the present invention, the agitated vessel is a single-shaft mixer kneader, wherein the vacuum residuals are continuously fed into the single-shaft mixer kneader through at least one feed point of that single-shaft mixer kneader, wherein the shaft of the single-shaft mixer kneader is equipped with kneading elements and wherein the single-shaft mixer kneader comprises a housing which is equipped with kneading counter-elements, wherein the kneading elements and the kneading counter-elements are arranged in a co-operating fashion, wherein the housing comprises at least one vapour connection, wherein the vacuum residuals are conveyed alongside the single-shaft mixer kneader to a discharge device of the single-shaft mixer kneader,
wherein the vacuum residuals in the single-shaft mixer kneader are subjected to a vacuum of 10 mbar or lower and to a temperature of at least 300° C. to remove volatiles which could not be removed by the distillation steps through the at least one vapour connection, and wherein the remaining non-volatile matter is discharged through the discharge device.

An example of kneading elements mounted to the shaft and kneading counter-elements mounted to the housing are, for example, shown in DE 37 44 269. Kneading elements may be kneading bars mounted on disks. Kneading counter-elements may be formed as hooks. The aforementioned elements preferably co-operate or interact, for example in a combing fashion.

The shaft of the single-shaft mixer kneader may be equipped with at least one mechanical seal. It is also possible to equip the kneader with a stuffing box, however, usually mechanical seals provide better tightening.

Preferably, at least two mechanical seals are used.

The vapour connection may be any means where vapours can be removed from the vessel or the mixer kneader such as a hole which can be connected to a tube to remove the vapour. Preferably the vapour connection has a large cross-sectional area.

Both, single- and twin-shaft mixer kneaders according to the present invention may be referred to as kneader reactors also.

According to another example of the present invention, the agitated vessel is a twin-shaft kneader, wherein the vacuum residuals are continuously fed into the twin-shaft mixer kneader through at least one feed point of that twin-shaft mixer kneader, wherein the shafts of the twin-shaft mixer kneader are equipped with kneading elements, wherein the kneading elements of both shafts are arranged in a co-operating fashion, wherein the housing comprises at least one vapour connection, wherein the vacuum residuals are conveyed alongside the twin-shaft mixer kneader to a discharge device of the twin-shaft mixer kneader, wherein the vacuum residuals in the twin-shaft mixer kneader are subjected to a vacuum of 10 mbar or lower and to a temperature of at least 300° C. to remove volatiles which could not be removed by the distillation steps through the at least one vapour connection, and wherein the remaining non-volatile matter is discharged through the discharge device.

The shafts of the twin-shaft mixer kneader are equipped with at least one mechanical seal or at least one stuffing box as mentioned above with respect to the single-shaft mixer kneader.

All mixer kneaders according to the present invention may be equipped with a discharge screw or another discharge device, preferably a gas-tight discharge device. For example, the mixer kneader can be equipped with a lock vessel system to keep the vacuum.

A liquid agent may be introduced into the agitated vessel which can transition into the gaseous phase in order to reduce the partial pressure of other gaseous component present in the agitated vessel.

BRIEF DESCRIPTION OF THE DRAWINGS

Further details and advantages of the present invention are discussed with respect to the preferred examples presented hereafter and with respect to the figures.

DETAILED DESCRIPTION

Figure 1:
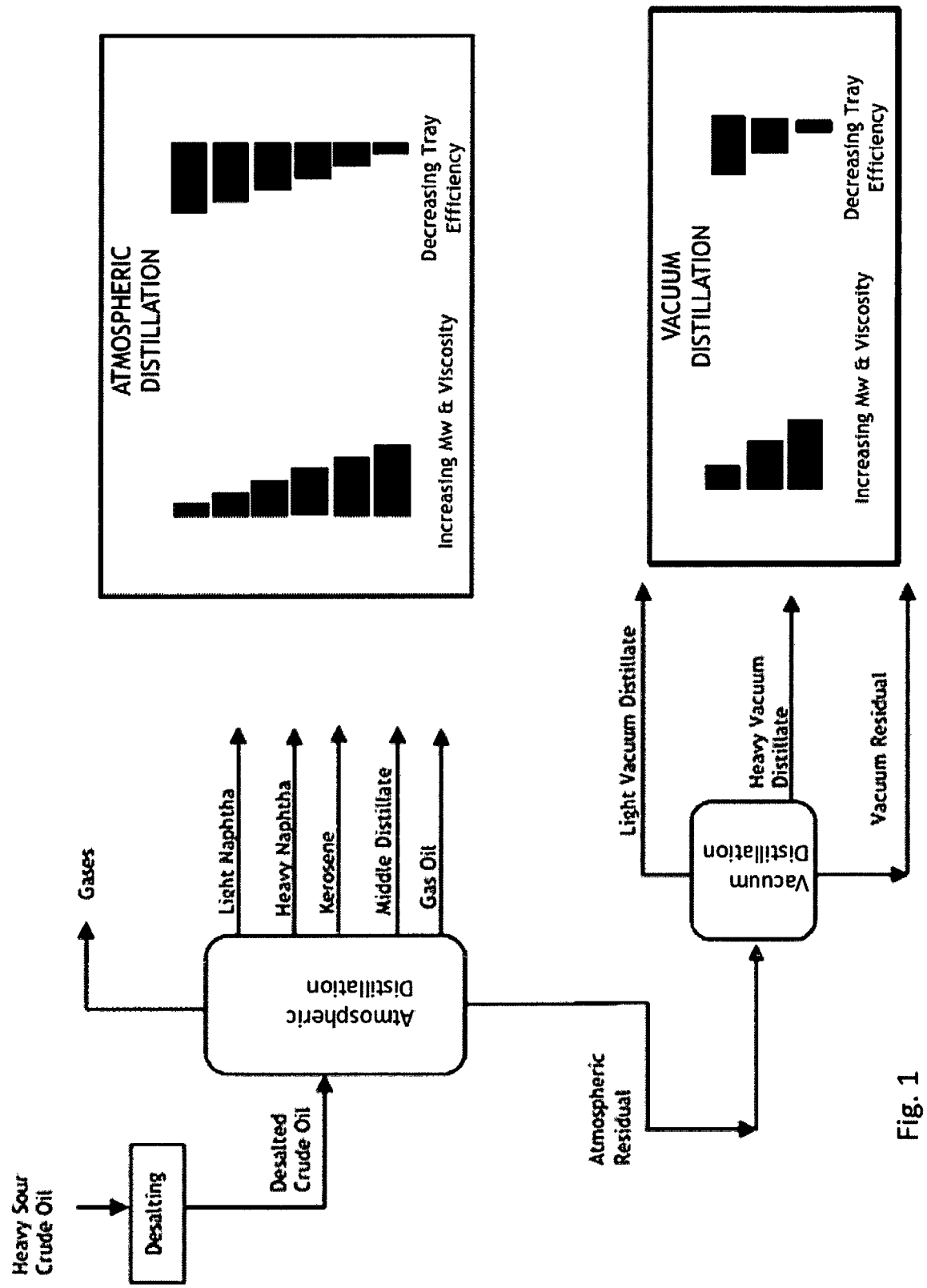
FIG. 1 shows the first steps of a typical refinery process according to the state of the art at the left side.

FIG. 1 shows how valuable substances are obtained by the first steps in a state-of-the-art refinery process. The left side of FIG. 1 schematically shows especially the distillation steps performed in distillation columns yielding the valuable substances as indicated in FIG. 1 above the arrows.

On the right side of FIG. 1, the gradients of molecular weight (Mw) and viscosity as well as tray efficiency is illustrated with respect to the substances obtained from the distillation step on the left side of FIG. 1. The uppermost bar on the right side in figure one refers to gases obtained from atmospheric distillation, the lowermost one refers to vacuum residuals obtained from vacuum distillation.

The bars are only illustrative. However, if inspected separately for each distillation step, they show the gradients observed when comparing the substances and intermediate products indicated on the left side.

Figure 2:
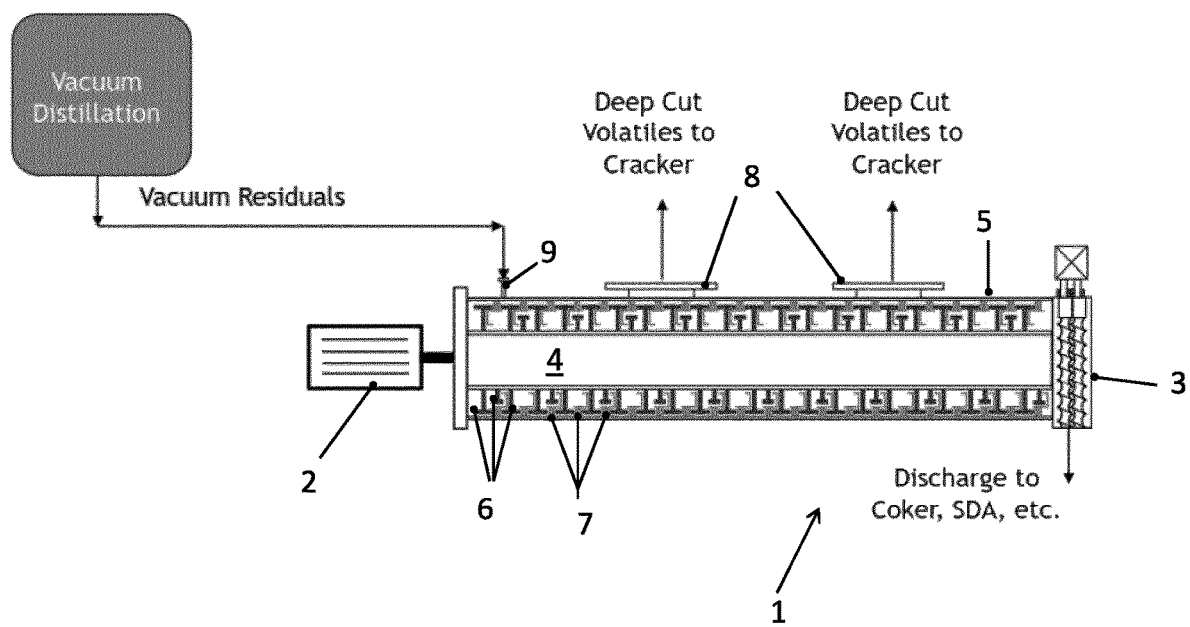
FIG. 2 shows in detail the treatment of the vacuum residuals according to the present invention.

FIG. 2 shows an example of the present invention where the vacuum residuals (cf. FIG. 1) are not directly discharged or introduced to a coker, but instead treated in a single-shaft mixer kneader 1 where an additional distillation step is performed.

The engine 2 of the single-shaft mixer kneader 1 is shown as well as the shaft 4, the double-shaft discharge screw 3 and the housing 5. Furthermore, the vapour connections 8, the feed point 9 are shown. The kneading elements 6 mounted on the shaft 4 are shown as well as the kneading counter-elements 7 mounted on the housing 5.

Figure 3:
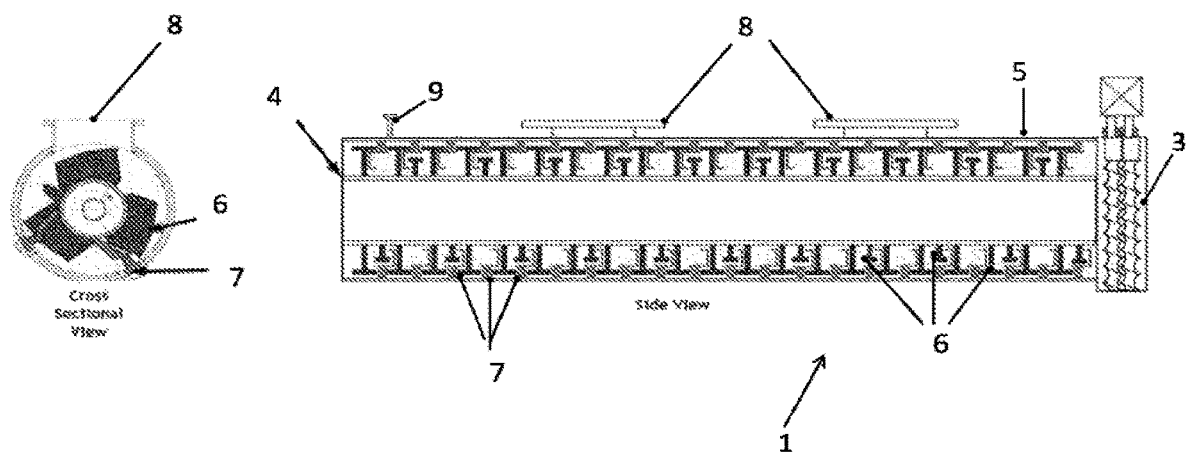
FIGS. 3 and 4 show the working mechanism of a single-shaft mixer kneader according to an example of the present invention.

FIG. 3 shows an enlarged view of the single-shaft mixer kneader 1 of FIG. 2, the engine 2 is left out for the sake of simplicity. Moreover, a cross-sectional view of the single-shaft mixer kneader 1 is shown.

Figure 4:
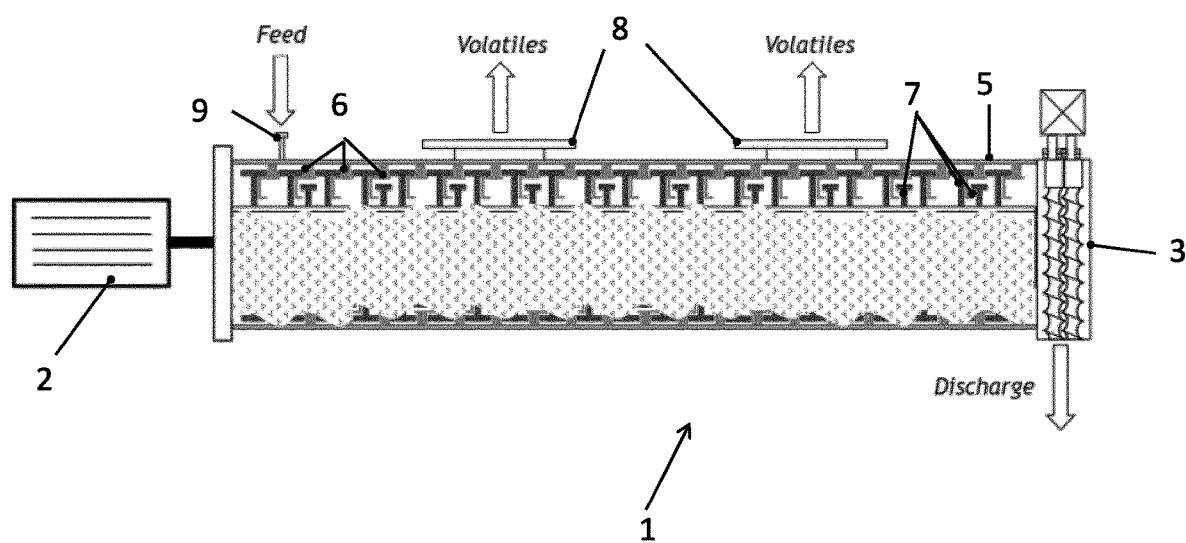

FIG. 4 shows the single-shaft mixer kneader 1 of FIG. 2 filled with vacuum residual which does not completely fill the inside of the housing 5.

According to an example of the present invention, vacuum residuals origination from the vacuum distillation step are introduced into the single-shaft mixer kneader 1 via feed point 9, are transported alongside the single-shaft mixer kneader 1 while being mixed by the co-operating kneading elements 6 and kneading counter-elements 7 and volatile compounds including valuable substances are removed via the vapour connections 8. The remaining matter is then discharged by the discharge screw 3. During that process, heat and vacuum is applied.

| Reference number list | |
|---|---|
| 1 | Single-shaft mixer kneader |
| 2 | Engine |
| 3 | Double-shaft discharge screw |
| 4 | shaft |
| 5 | Housing |
| 6 | Kneading elements |
| 7 | Kneading counter-elements |
| 8 | Vapour connection |
| 9 | Feed point |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | |
| 26 | |
| 27 | |
| 28 | |
| 29 | |
| 30 | |
| 31 | |
| 32 | |
| 33 | |
| 34 | |
| 35 | |
| 36 | |
| 37 | |
| 38 | |
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |

The invention claimed is:

1. Method for continuously treating vacuum residuals originating from a refinery of crude oil, wherein the crude oil is subjected to a first and a second distillation step, wherein the second distillation step is performed under vacuum conditions, wherein the vacuum residuals are obtained after the second distillation step, wherein the vacuum residuals are continuously fed into an agitated vessel, the agitated vessel is a single-shaft mixer kneader, wherein the vacuum residuals are continuously fed into the single-shaft mixer kneader through at least one feed point of that single-shaft mixer kneader, wherein the shaft of the single-shaft mixer kneader is equipped with kneading elements and wherein the single-shaft mixer kneader comprises a housing which is equipped with kneading counter-elements, wherein the kneading elements and the kneading counter-elements are arranged in a co-operating fashion, wherein the housing comprises at least one vapour connection, wherein the vacuum residuals are conveyed alongside the single-shaft mixer kneader to a discharge device of the single-shaft mixer kneader, wherein the vacuum residuals in the single-shaft mixer kneader are subjected to a vacuum of 10 mbar or lower and to a temperature of at least 300° C. to remove volatiles which could not be removed by the distillation steps through the at least one vapour connection, and wherein the remaining non-volatile matter is discharged through the discharge device.

2. Method according to claim 1, wherein the shaft of the single-shaft mixer kneader is equipped with at least one mechanical seal.

3. Method according to claim 1, wherein the mixer kneader is equipped with a discharge screw.

4. Method according to claim 1, wherein a liquid agent is added to the agitated vessel, which can transition into the gaseous phase in order to reduce the partial pressure of other gaseous components present in the agitated vessel.

* * * * *